US011274659B2

(12) United States Patent
Godenau et al.

(10) Patent No.: US 11,274,659 B2
(45) Date of Patent: Mar. 15, 2022

(54) WIND TURBINE ROTOR BLADE

(71) Applicant: Wobben Properties GmbH, Aurich (DE)

(72) Inventors: Diethelm Godenau, Aurich (DE); Sven Krebs, Leer (DE)

(73) Assignee: Wobben Properties GmbH, Aurich (DE)

( * ) Notice: Subject to any disclaimer, the term of this patent is extended or adjusted under 35 U.S.C. 154(b) by 223 days.

(21) Appl. No.: 16/613,648

(22) PCT Filed: May 18, 2018

(86) PCT No.: PCT/EP2018/063033
§ 371 (c)(1),
(2) Date: Nov. 14, 2019

(87) PCT Pub. No.: WO2018/211055
PCT Pub. Date: Nov. 22, 2018

(65) Prior Publication Data
US 2021/0088024 A1    Mar. 25, 2021

(30) Foreign Application Priority Data

May 18, 2017    (DE) .................... 10 2017 110 797.5

(51) Int. Cl.
*F03D 80/40*    (2016.01)
*F03D 1/06*    (2006.01)
(52) U.S. Cl.
CPC .......... *F03D 80/40* (2016.05); *F03D 1/0675* (2013.01); *F05B 2240/21* (2013.01)

(58) Field of Classification Search
CPC ......... F03D 80/40; F03D 80/60; B64D 15/02; B64D 15/04
See application file for complete search history.

(56) References Cited

U.S. PATENT DOCUMENTS

| 8,029,239 | B2 | 10/2011 | Luetze |
| 9,828,972 | B2 | 11/2017 | Cuoghi et al. |
| 2013/0101414 | A1* | 4/2013 | Weitkamp ............... F03D 80/40 416/1 |
| 2015/0056074 | A1 | 2/2015 | Veldkamp et al. |

(Continued)

FOREIGN PATENT DOCUMENTS

| CA | 2988834 A1 | 2/2017 |
| CN | 101029624 A | 9/2007 |

(Continued)

OTHER PUBLICATIONS

Langenscheidt Dictionary, "Schlitz" English translation (Year: 2021).*

*Primary Examiner* — Topaz L. Elliott
(74) *Attorney, Agent, or Firm* — Seed Intellectual Property Law Group LLP

(57) ABSTRACT

A wind turbine rotor blade is provided with a rotor blade root region, a rotor blade tip region, a pressure side, a suction side, a leading edge, a trailing edge and at least one flange along a longitudinal direction of the rotor blade. Furthermore, a deflecting unit is provided between one end of the at least one flange and the rotor blade tip region. At least one air scoop is provided on the flange, wherein the air scoop protrudes in a region between a first and second flange.

6 Claims, 6 Drawing Sheets

(56) References Cited

U.S. PATENT DOCUMENTS

| | | | |
|---|---|---|---|
| 2016/0047356 A1 | 2/2016 | Pawis et al. | |
| 2017/0254316 A1* | 9/2017 | Philipsen | ................ F03D 80/40 |
| 2018/0216603 A1* | 8/2018 | Pawis | .................... F03D 80/40 |

FOREIGN PATENT DOCUMENTS

| | | | | | |
|---|---|---|---|---|---|
| CN | 202194784 | U | | 4/2012 | |
| CN | 104169576 | A | | 11/2014 | |
| CN | 106224181 | A | | 12/2016 | |
| CN | 108730133 | A | * | 11/2018 | ............ F03D 80/40 |
| DE | 20014238 | U1 | | 6/2001 | |
| DE | 102010051292 | A1 | * | 5/2012 | ............ F03D 80/40 |
| DE | 102010051293 | A1 | | 5/2012 | |
| DE | 102010051295 | A1 | | 5/2012 | |
| DE | 102010051297 | A1 | | 5/2012 | |
| DE | 102013206493 | A1 | | 10/2014 | |
| DE | 102015013369 | A1 | | 4/2017 | |
| JP | 2014218944 | A | | 11/2014 | |
| WO | 2017/021350 | A1 | | 2/2017 | |

* cited by examiner

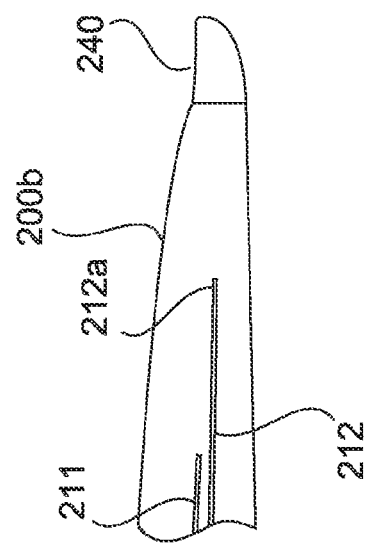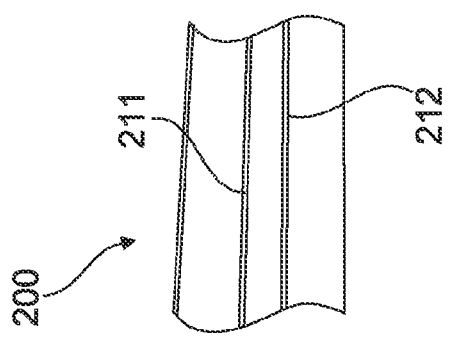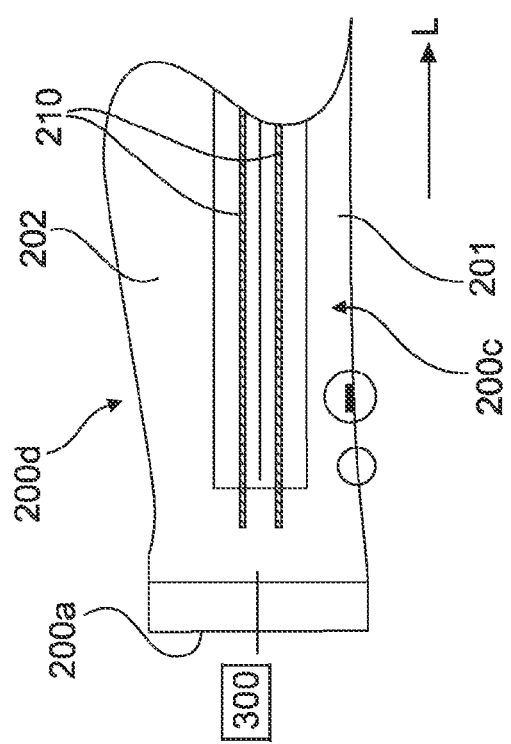
Fig. 2

WIND TURBINE ROTOR BLADE

BACKGROUND

Technical Field

The present invention relates to a wind turbine rotor blade as well as a wind turbine with a corresponding rotor blade.

Description of the Related Art

Since the rotor blades of a wind turbine are exposed to all weather conditions unprotected, at certain temperatures icing of the rotor blades can occur. In order to prevent this, rotor blade heating can be used. In this case, either heating can be provided outside on the rotor blade or heated air can be provided inside the rotor blade.

WO 2017/021350 A1 discloses a wind turbine rotor blade with a rotor blade root region and a rotor blade tip region. Furthermore, at least one flange is provided along a longitudinal direction of the rotor blade. A deflector in the form of a drop-shaped portion can be provided on the flange in order to reduce any turbulence of the air during reflection.

BRIEF SUMMARY

Provided is a wind turbine rotor blade which enables an improved heating of the rotor blade.

A wind turbine rotor blade is provided with a rotor blade root region, a rotor blade tip region, a pressure side, a suction side, a leading edge, a trailing edge and at least one flange between the pressure side and the suction side and along a longitudinal direction of the rotor blade. Furthermore, a deflector is provided between one end of the at least one flange and the rotor blade tip region. At least one air scoop is provided on the flange, wherein the air scoop protrudes in a region between a first and second web.

According to one aspect of the present invention, the rotor blade has a boundary layer extraction unit which adjoins the rotor blade tip-side end of the first and second flange. The boundary-layer extraction unit is used to extract a (turbulent) boundary layer of an air flow.

According to a further aspect of the present invention, the boundary-layer extraction unit has a plurality of recesses.

According to a further aspect of the present invention, a first end of the boundary-layer extraction unit adjoins a first flange and a second end of the boundary-layer extraction unit adjoins one end of the second flange.

According to one aspect of the present invention, the rotor blade tip region has an at least partially hollow rotor blade tip. The deflector substantially closes the rotor blade tip region, wherein a first ventilation channel is provided between one end of the deflector and a nose cap, and a second air channel is provided between one end of the deflector and a trailing edge.

Provided is a wind turbine having at least one wind turbine rotor blade described above.

According to one aspect of the present invention, warm or heated air can be introduced or made to flow in to heat the rotor blade in the rotor blade root region. According to one aspect of the present invention, the heated air is preferably introduced in the region between the leading edge and a flange and flows along the leading edge and the flange from the rotor blade root region to the rotor blade tip region. In this case, a part of this air flow can be at least partially removed by the air scoop which is provided in the flange or a part of the air flow is deflected by the air scoop into a region between the two flanges and flows in the direction of the rotor blade root region, Alternatively to this, the heated air can flow into the region between the trailing edge and the other flange from the rotor blade root region to the rotor blade tip region.

Thus, a wind turbine rotor blade is provided with a rotor blade root region, a rotor blade tip region, a pressure side, a suction side, at least one flange which extends along a longitudinal direction of the rotor blade. In conventional rotor blades, the rotor blade tip is typically configured to be hollow but filled with a foam filling material. This prevents an effective heating of the rotor blade tip. This can lead to ice formation in particular in the region of the rotor blade tip and results in dangerous dropping of ice as a result of the high speed of the rotor blade tip. Furthermore, a heatable blade tip with an adapted deflection in the rotor blade tip region is provided. Furthermore, a flange bulkhead can optionally be provided. For further improvement, a bypass air scoop can be provided which optimizes the flow in the deflecting region in which the boundary layer flow is extracted at the end of the flange and thus flow detachment and turbulence can be reduced.

According to one aspect of the present invention, a deflector, for example, in the form of a foam wedge is provided in the region of the rotor blade tip. This deflector serves to deflect an air flow at the leading edge so that the trailing edge can also be heated with heated air. The foam wedge can be provided so that a part of the air can flow past it into a rotor blade tip and can flow out again in order to heat the rotor blade tip. With the rotor blade, it is possible that the main flow is guided by an integrated deflection in the direction of the blade flange whereas an auxiliary flow is guided in the nose cap region along the deflection to the rotor blade tip.

According to one aspect of the present invention, holes can be provided in the rotor blade tip to be able to ensure removal of water from the rotor blade tip. Optionally a grid can be provided in front of an air inlet of the rotor blade tip in order to be able to prevent blocking of the water removal.

According to one aspect of the present invention, an air scoop can be provided in the region of one of the flanges to enable a bypass. This can result in a negative pressure in the tip-side torsion channel.

According to the invention, a volume flow of the blade heating can be increased. With the rotor blade according to the invention it is possible to optionally deflect an air flow at each flow rate and reduce a pressure loss. With the rotor blade according to the invention, flow detachment and turbulence in the deflecting region can be reduced. The rotor blade or rotor blade tip can be de-iced to reduce dropping of ice.

With the rotor blade according to the invention, the air flow of a rotor blade heating is improved in a simple and uncomplicated manner without thereby negatively influencing the lightning protection. By means of the air scoop a negative pressure is produced in the region between the first and second flange. Thus, the air scoop serves to support the flow.

Additionally or alternatively to this, a deflector can then be provided which has the smallest possible variation in cross-sectional area, wherein the flow channel has a small variation in cross-sectional area after installation of the deflector.

A wind turbine rotor blade is provided which has at least one, preferably two flanges along the longitudinal direction of the rotor blade. For heating the rotor blade an air flow can be provided along the flanges. The air flow starts in the rotor blade root region and the preferably heated air flows along the first and/or second flange and must be deflected in the rotor blade tip region. In order to improve the air flow, at least one air scoop is provided in one of the flanges, wherein a hole is provided in the flange at the location of the air scoop so that by means of the air scoop a negative pressure can preferably be provided in a region between the first and second flange. For further improvement of the air flow a boundary-layer extraction unit, for example, in the form of a boundary-layer extraction plate can be provided at the free ends of the first and second flange. Between the boundary-layer extraction unit and the air scoop, a synergy effect is provided since the air scoop in the flange can produce a negative pressure in the region between the first and second flange, with the result that the boundary-layer extraction by means of the boundary-layer extraction unit is improved.

Optionally a hollow rotor blade tip can be provided, in front of which a deflector is provided which leaves free a first and second air channel between the deflector and the shells of the rotor blade so that the hollow rotor blade tip can be heated or can have warm air flowing through it.

According to one aspect of the present invention, at least one air scoop is provided on a first flange and between the first and second flange. In the region of the air scoop a hole must be provided in the flange so that air can flow through this hole and the air scoop in the region between the first and second flange. The air scoop firstly has the function of deflecting an air flow in a region between the first flange and a leading edge of the rotor blade in a region between the first and second flange, wherein the flow then flows further in the direction of the rotor blade root. The air scoop further has the function together with the boundary-layer extraction unit of extracting an in particular turbulent boundary layer in the region of the boundary-layer extraction unit. Together with the boundary-layer extraction unit, the air scoop acts like an ejector pump and has the result that a negative pressure is formed in the region between the first and second flange.

According to an alternative aspect of the present invention, the air scoop can also be arranged on the second flange when the air in the region between the second flange and the end edge flows from the rotor blade root region to the rotor blade tip region.

Alternatively to this, the air scoop can be provided both in the first and in the second flange when the air flow is guided both along the leading edge and also along the trailing edge from the rotor blade root region to the rotor blade tip region.

According to one aspect of the present invention, the slots 281 in the boundary-layer extraction plate have a width of <=5 mm.

Further embodiments of the invention are the subject of the claims.

BRIEF DESCRIPTION OF THE SEVERAL VIEWS OF THE DRAWINGS

Advantages and exemplary embodiments of the invention are explained in detail hereinafter with reference to the drawings.

FIG. 2 shows a schematic and sectional view of a rotor blade of the wind turbine from FIG. 1.

DETAILED DESCRIPTION

Figure 1:
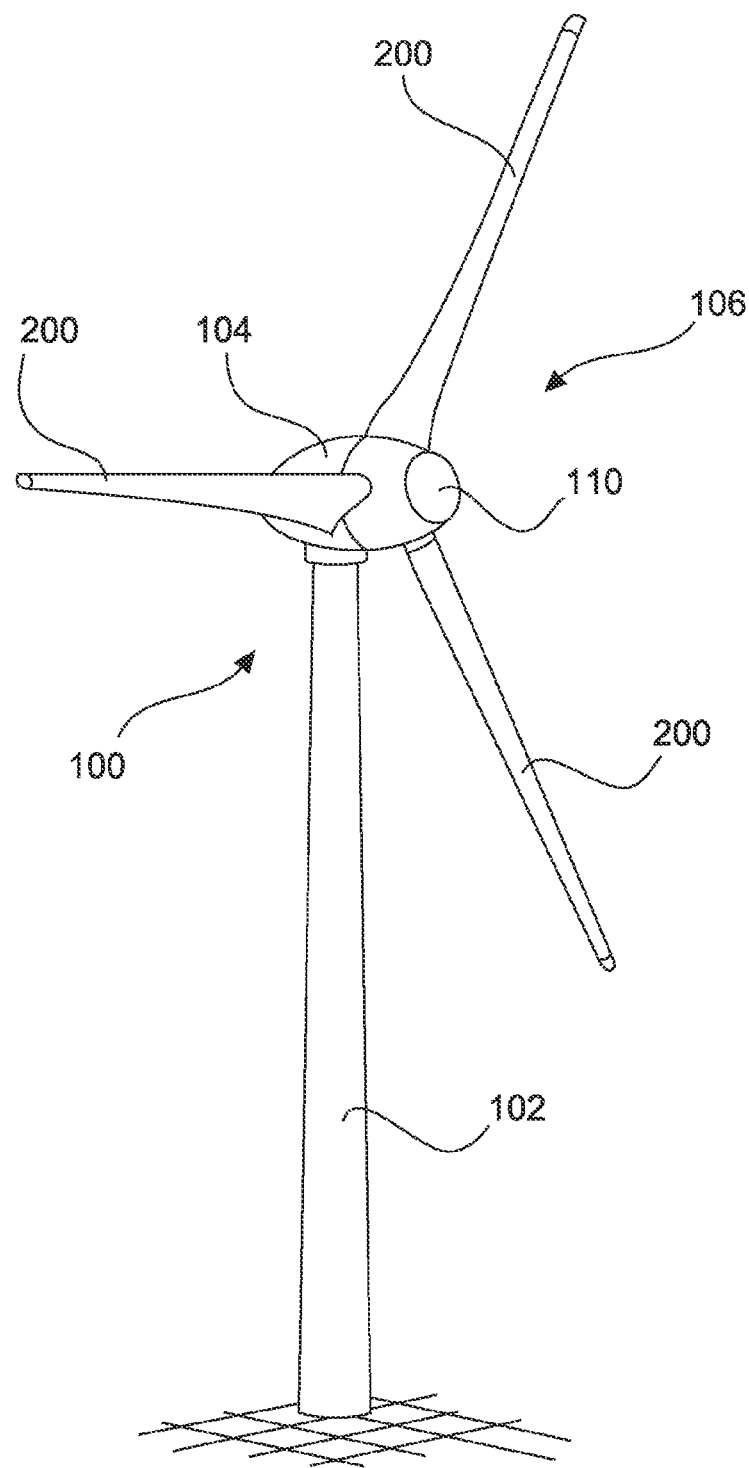
FIG. 1 shows a schematic diagram of a wind turbine.

FIG. 1 shows a schematic diagram of a wind turbine. The wind turbine 100 comprises a tower 102 and a nacelle 104 on the tower 102. An aerodynamic rotor 106 with three rotor blades 200 and a spinner 110 is provided on the nacelle 104. The aerodynamic rotor 106 is set in rotary movement by the wind during operation of the wind turbine and thus also turns a rotor or rotor of a generator which is coupled directly or indirectly to the aerodynamic rotor 106. The electric generator is arranged in the nacelle 104 and generates electrical energy. The pitch angle of the rotor blades 200 can be varied by pitch motors on the rotor blade roots of the respective rotor blades 200.

FIG. 2 shows a schematic and sectional view of a rotor blade of the wind turbine from FIG. 1. The rotor blade 200 has a rotor blade root region 200a, a rotor blade tip region 200b, a rotor blade tip 240, a leading edge 201, a trailing edge 202, a pressure side 200c and a suction side 200d. At least one flange 210 extends along a longitudinal direction L of the rotor blade 200 inside the rotor blade. For example, two flanges 211, 212 can be provided, which can initially be arranged parallel and running towards one another in the region of the rotor blade tip 240. In this case, the length of the first flange 211 can be less than the length of the second flange 212. The rotor blade tip 240 can be configured as a separate part and be fastened to the rest of the rotor blade 200.

Heated air can be guided along the flanges in the direction of the rotor blade tip 240 and then deflected. Optionally the rotor blade tip can be configured to be at least partially hollow so that a portion of the heated air can flow through the rotor blade tip 240 to de-ice the rotor blade tip 240.

According to one aspect of the present invention, the heated air can either be produced in the rotor blade root region in which air is heated by means of a heater 300 or the heated air is fed to the rotor blade in the rotor blade root region.

Figure 3:
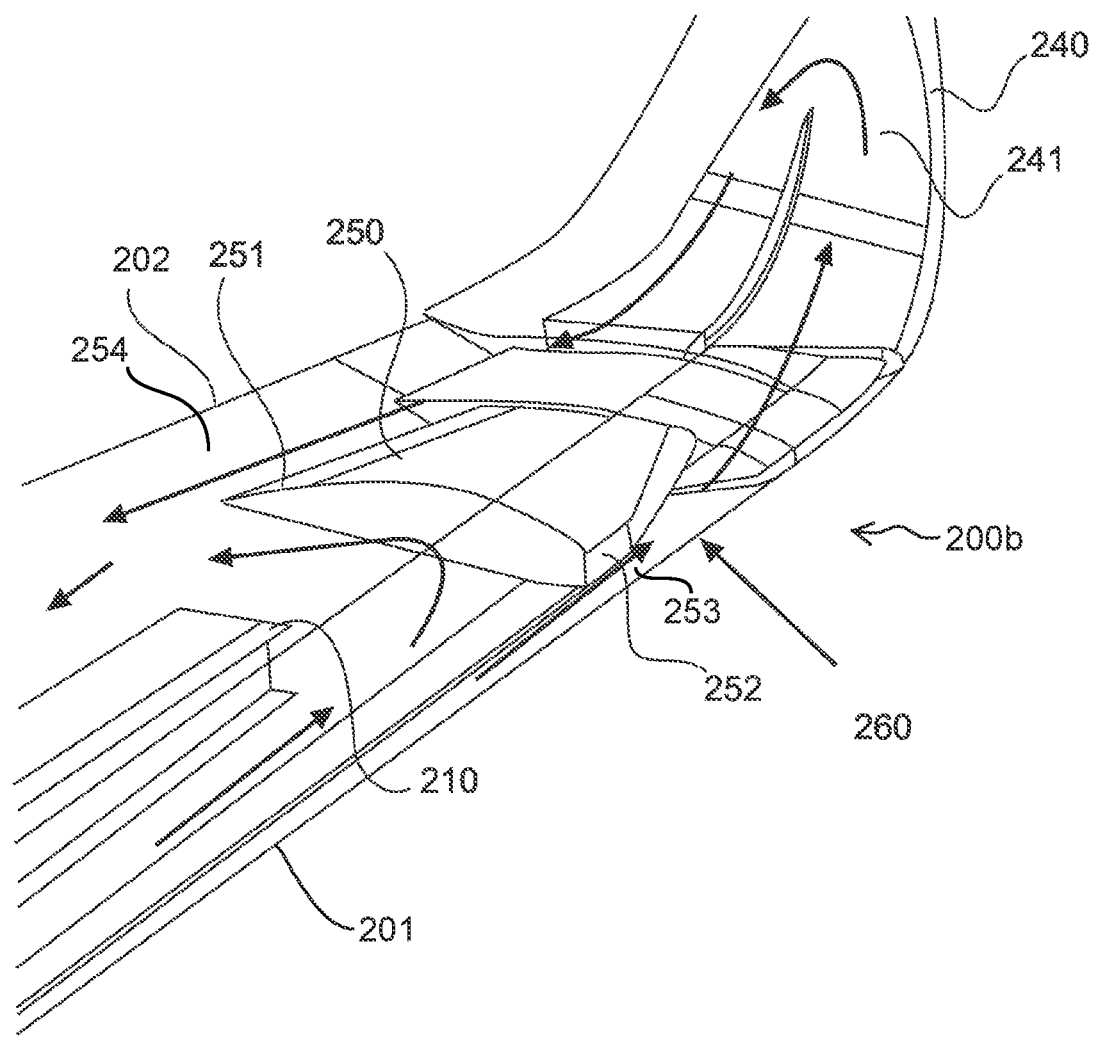
FIG. 3 shows a schematic diagram of a rotor blade tip region of the rotor blade.

FIG. 3 shows a schematic diagram of a rotor blade tip region of the rotor blade. From the rotor blade root region 200a an air flow (e.g., air heated by the heater 300) flows along the leading edge 201 to the rotor blade tip region 200b and there impinges upon a deflector 250 which, for example, can be configured as a foam wedge. A rotor blade nose cap 260 can be provided in the rotor blade tip region 200b. The deflector 250 has a first end 251 and a second end 252. A free space 253 can be provided between the second end 252 and the rotor blade nose cap 260 so that a portion of the air flow can flow into the rotor blade tip 240 through this free space. The rotor blade tip 240 can at least partially comprise a hollow space 241 so that the air can flow into the hollow space 241 and can flow out again. A further passage 254 is further provided between the first end 251 of the deflector and a trailing edge 202 so that the air can flow through here. The majority of the air flow is then deflected through the deflector 250 so that the air can then flow between the first flange 211 and the trailing edge 202 back again to the rotor blade root 200a.

Figure 4:
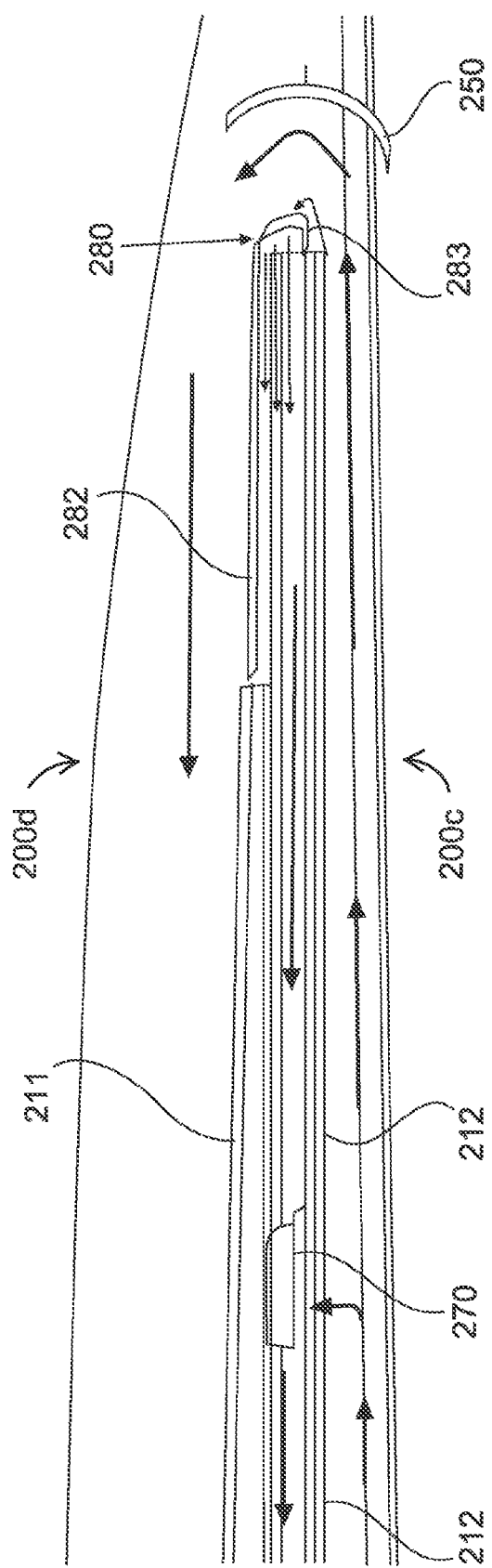
FIG. 4 shows a schematic diagram of a section of the rotor blade.

FIG. 4 shows a schematic diagram of a section of the rotor blade. For further improvement of the air flow, an air scoop 270 can be provided in the first flange 211. The air scoop 270 then extends into the region between the first and second flange 211, 212.

According to one aspect of the present invention, a rotor blade can be provided with an air scoop on the second flange 212 without providing a deflector 250. Furthermore, the rotor blade need not have a hollow blade tip.

For further improvement of the air flow in the region of the rotor blade tip, a boundary-layer extraction unit 280 can be provided which can be provided in the region of the ends of the first and second flange.

Figure 5:
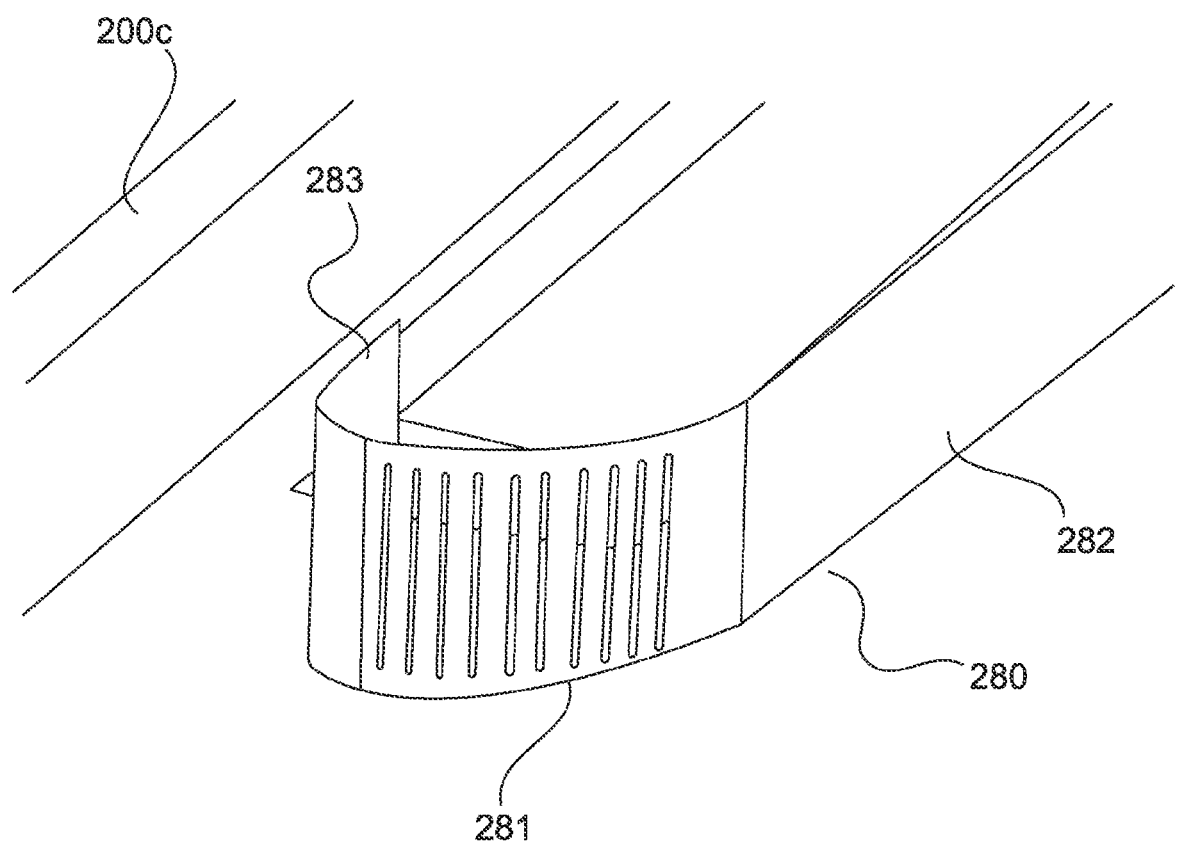
FIG. 5 shows a schematic illustration of a further section of the rotor blade.

FIG. 5 shows a schematic illustration of a further section of the rotor blade. The boundary-layer extraction unit 280 can be configured as a boundary-layer extraction plate and can have a first end 282 and a second end 283. The second end 283 is coupled to one end of the second flange 212 whilst the first end 282 is coupled to an end of the first flange 211 as best shown in FIG. 4. Furthermore a plurality of elongate slots 281 are provided.

Figure 6:
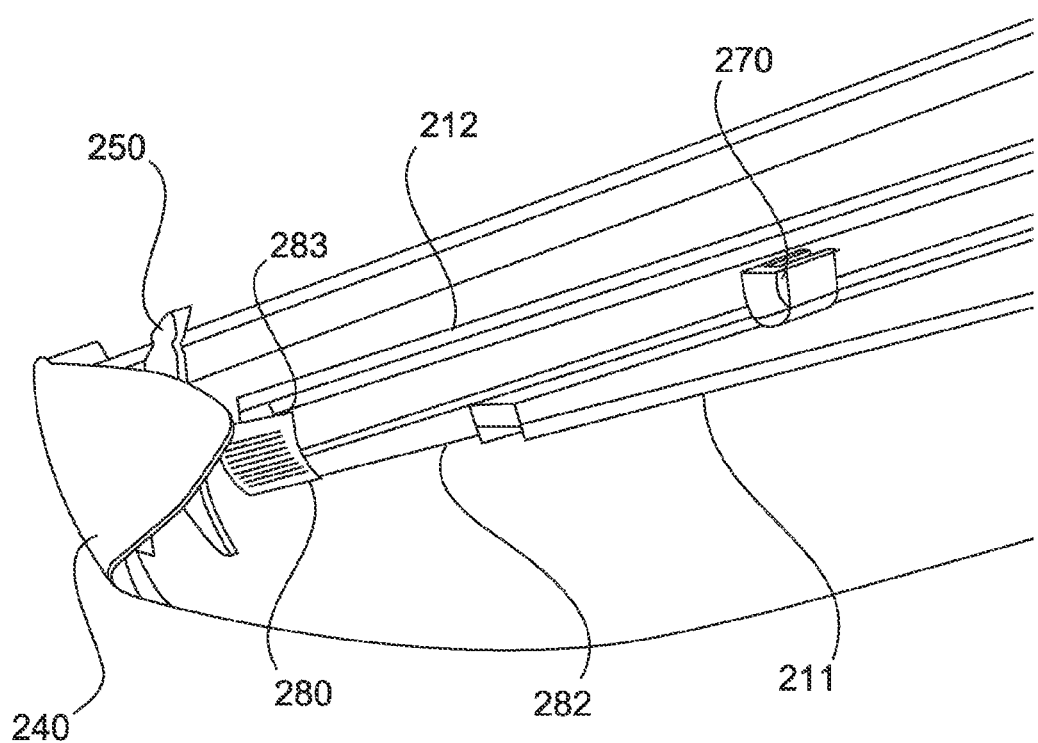
FIG. 6 shows a schematic diagram of the rotor-blade-tip side region of the rotor blade.

FIG. 6 shows a schematic diagram of the rotor-blade-tip-side region of the rotor blade. FIG. 6 in particular shows the rotor blade tip 240, a foam wedge 250, the air scoop 270 and the boundary-layer extraction unit 280, e.g., in the form of a boundary-layer extraction plate.

The air scoop 270 is provided at or in the region of the flange 212 and serves as a bypass air scoop. By means of this air scoop 270 a flow in the deflecting region can be optimized in that the boundary-layer flow is extracted at the flange end and flow detachments and turbulence are reduced. For further improvement of the flow in the deflection region, a boundary-layer extraction unit 280 is provided which comprises elongate recesses in the deflection region. The deflector 250 can be implemented as a foam wedge and serves as a deflection for an air flow. The deflector 250 is provided in the region of the rotor blade tip 240. The deflector 250 can in this case serve as a flange extension and ensure an improved air guidance into the blade tip. In this case, a main flow which impinges upon the deflector can be deflected accordingly so that it, for example, flows back between the first and second flange 211, 212 or between the flange 211 and the trailing edge back to the rotor blade root. A partial flow flows between the two flanges back to the rotor blade root and a portion of the flow flows between the flange 211 and the trailing edge back to the rotor blade root.

The invention claimed is:

1. A wind turbine rotor blade, comprising:
   a rotor blade root region,
   a rotor blade tip region,
   a pressure side,
   a suction side,
   a leading edge,
   a trailing edge,
   first and second flanges extending between the pressure side and the suction side and along a longitudinal direction of the rotor blade,
   a deflector between the rotor blade tip region and first ends of the first and second flanges, wherein the deflector is configured to deflect heated air flowing from the rotor blade root region along the first and second flanges,
   at least one air scoop on one of the first or second flanges, and
   a boundary-layer extraction plate that adjoins the first ends of the first and second flanges at the rotor blade tip region, wherein the boundary-layer extraction plate is configured to extract a turbulent boundary layer.

2. The wind turbine rotor blade according to claim 1, wherein the at least one air scoop protrudes in a region between the first flange and the second flange, and is configured to produce a negative pressure in the region.

3. The wind turbine rotor blade according to claim 1, wherein the boundary-layer extraction plate comprises a plurality of slots.

4. The wind turbine rotor blade according to claim 1, wherein the boundary-layer extraction plate has a first end coupled to the first flange and a second end coupled to the second flange.

5. The wind turbine rotor blade according to claim 1, wherein the rotor blade tip region comprises an at least partially hollow rotor blade tip,
   wherein the deflector covers a portion of the rotor blade tip region,
   wherein the wind turbine rotor blade further comprises a first air channel and a second air channel, wherein the first air channel is between a first end of the deflector and a nose cap, and the second air channel is between a second end of the deflector and the trailing edge.

6. A wind turbine comprising at least one wind turbine rotor blade according to claim 1.

* * * * *